US008042243B1

(12) United States Patent
Chou

(10) Patent No.: US 8,042,243 B1
(45) Date of Patent: Oct. 25, 2011

(54) APPARATUS FOR SINGLE HAND ATTACHMENT OF DRYWALL CORNER BEADS

(75) Inventor: Kam Wa Chou, Boston, MA (US)

(73) Assignee: See Wai Chan and Henry G. Chou, Boston, MA (US)

(*) Notice: Subject to any disclaimer, the term of this patent is extended or adjusted under 35 U.S.C. 154(b) by 1274 days.

(21) Appl. No.: 11/409,231

(22) Filed: Apr. 21, 2006

Related U.S. Application Data

(60) Provisional application No. 60/761,546, filed on Jan. 24, 2006.

(51) Int. Cl.
*B23P 11/00* (2006.01)
*B23P 19/00* (2006.01)
*B23P 19/04* (2006.01)
*B25B 27/14* (2006.01)

(52) U.S. Cl. ............. 29/243.5; 29/243; 29/244; 29/275; 29/798; 72/325

(58) Field of Classification Search ................. 29/243.5, 29/244, 464, 798, 897, 897.3, 275, 278; 30/175, 30/229, 131, 132, 134; 52/749.1, 631; 72/325, 72/409.1, 444, 449, 450, 451; 74/500.5, 74/501.6; 227/140, 148, 152, 30, 156; 414/739, 414/740; 269/41, 237, 239; 81/321, 359, 81/364, 381, 385, 487
See application file for complete search history.

(56) References Cited

U.S. PATENT DOCUMENTS 879,547 A * 2/1908 Holter .......................... 269/54.2
2,189,573 A * 2/1940 Wegner ........................ 72/409.1
2,944,262 A * 7/1960 Richman et al. ................ 72/325
4,127,226 A 11/1978 Jasper
4,228,016 A * 10/1980 Hunter .......................... 507/225
4,288,016 A 9/1981 Failla et al.
4,574,452 A 3/1986 Kennedy et al.
4,593,443 A * 6/1986 Wolford ....................... 29/243.5
4,893,493 A * 1/1990 Jacques et al. .................. 72/325
4,989,438 A * 2/1991 Simon ............................. 72/325
5,065,930 A 11/1991 Kennedy
5,313,755 A 5/1994 Koenig, Jr.
5,368,461 A 11/1994 Murphy
5,524,807 A 6/1996 Bullard
5,531,050 A 7/1996 Stibolt et al.
5,615,530 A 4/1997 Kartler (Continued)

*Primary Examiner* — David Bryant
*Assistant Examiner* — Alexander P Taousakis
(74) *Attorney, Agent, or Firm* — Burns & Levinson LLP; Bruce D. Jobse, Esq.

(57) ABSTRACT

A tool that can be held and operated with one hand to attach a corner bead to an outside corner of drywall includes a substantially V-shaped member having a pair of interior surfaces disposed at an angle of less than 100° and a frame or handle attached thereto. The handle maybe sized and shaped to fit comfortably in the palm of a human hand. A lever is pivotally attached to the handle. A pair of opposed pincers having pointed tips are pivotally mounted relative to the V-shaped member so as to allow the tips to move in a converging direction. A mechanical linkage system translates force applied to the lever into a the converging motion of the pincers. The apparatus facilitates transmitting to the corner bead force applied to the frame in a first direction and deforming the corner bead with a second force applied to the frame/lever in a second direction, the second force having a component in a second direction substantially opposite the first direction, the second force having a magnitude correlating to the defamation force applied to the corner bead.

13 Claims, 17 Drawing Sheets

U.S. PATENT DOCUMENTS 5,647,182 A 7/1997 Rutherford
5,667,126 A 9/1997 Boucek
5,916,101 A 6/1999 Stibolt
5,934,149 A * 8/1999 Tuda .......................... 74/502.2
5,950,902 A 9/1999 Moore, Sr.

* cited by examiner

FROM EAST OF HANDLE
14A
14
14E
80°

FROM WEST OF HANDLE
14C
14D
10.5
9
10.5

10.6
8.8
10.6
14D
80°
FROM EAST VIEW 5
12
7
7
7
18
5
16
14E

38

34A
34

44

APPARATUS FOR SINGLE HAND ATTACHMENT OF DRYWALL CORNER BEADS

FIELD OF THE INVENTION

The present invention relates generally to tools for construction purposes, and particularly to an apparatus for enabling single-handed attachment of corner beads to drywall configurations.

BACKGROUND OF THE INVENTION

Drywall is used pervasively well commercial and residential construction because of its ease of handling and ability to be cut into various shapes sizes. When two pieces of drywall are joined to form a right angle, i.e. an outside corner, an elongate metal frame known as a corner beads is mechanically secured over the outside corner to provide support and to maintain the drywall pieces prior to application of a finishing materials for thereover. Prior devices for attachment of corner beads to drywall corners usually require the worker to use one hand to hold a forming tool against the corner bead, thereby pressing the corner bead against the drywall pieces, while the workers second hand is used to apply pressure to the forming tool, typically with a rubber hammer. Because drywall corners may occur not only vertically but horizontally, it is sometimes awkward to use both hands for attachment of corner beads, particularly when a worker must utilize both hands overhead to manipulate the forming tool and hammer. Also, when applying pressure to the forming tool with repeated blows from a hammer, loosening of another portion of the corner bead already attached is quite common.

Some attempts have been made to simplify and automate the process of attaching a corner bead to an outside corner. For example, U.S. Pat. Nos. 4,288,016; 4,989,438; 5,524,807; 5,667,126; and 5,950,902 disclose apparatus for automated attachment of a corner bead to an outside drywall corner and, although, some of these devices theoretically may be hand-held, many utilize external sources of power such as pressurized air or electric current to operate pairs of fastening guns. As such, these apparatus are rather heavy and do not appear to be easily operated with only a single hand, particularly for overhead use. In addition, for externally powered devices the coupling to the external power source limits mobility of the operator during utilization of the tool. A further drawback fastening guns type apparatus is that the fastening element, whether a screw, staple or other device, oftentimes separates from the drywall any corner bead, i.e. "pops" overtime often due to environmental and stress factors.

Accordingly, a need exists for an apparatus that enables single-handed attachment of corner beads to drywall configurations.

A further need exists for an apparatus that enables single-handed attachment of corner beads to drywall configurations that is light and easily handled, particularly for overhead use.

A further need exists for an apparatus that enables single-handed attachment of corner beads to drywall configurations that uses only manual power to couple the corner bead to the drywall.

A further need exists for an apparatus that enables attachment of corner beads to drywall configurations without fasteners or other attachment devices.

SUMMARY OF THE INVENTION

The invention contemplates a tool that can be held and operated with one hand to attach a corner bead to an outside corner of drywall. A substantially V-shaped member having a pair of interior surfaces disposed at an angle of less than 100° has a frame or handle attached thereto. The handle may be sized and shaped to fit comfortably in the palm of a human hand. A lever is pivotally attached to the handle. A pair of opposed pincers having pointed tips which extend through apertures within the pair of interior surfaces are movably coupled to the V-shaped member so as to allow the tips to move in a converging direction. A mechanical linkage system translates force applied to the lever into a the converging motion of the pincers.

In one embodiment, the mechanical linkage system comprises a number of support posts attached to the V-shaped member. The first or center of the support posts is attached at the exterior center of the V-shaped member near one end thereof. The second and third support posts are attached at the same end along the exterior surfaces forming the V-shape. The non-pointed ends of the pincers are pivotally joined together at a point along the center support post. A spring biases the pincers into an open or divergent configuration. An L-shaped linkage is pivotally mounted to each of second and third support posts. In the illustrative embodiment, the short leg of each L-shaped linkage is in contact with one of the pincers. The longer leg of each L-shaped linkage is pivotally coupled to the first end of one of the two extension members. The extension members are pivotally coupled at their respective second ends to a carriage slidably disposed within a track or groove in the center support post. A tab extending from the carriage is secured to one end of a cable. The second end of the cable is pivotally secured to the previously described lever. In the illustrative embodiment the cable is of a coaxial design with a movable multistrand wire core extending through a semi-rigid tubular sheath. An extreme end of the wire core is attached to the carriage tab while the extreme end of the wire is coupled to the top of the center support post. A tension mechanism, such as a coiled spring, is disposed about unsheathed or exposed length of the wire core to bias the wire/carriage away from the top of the center support post, and, therefore, bias the lever into an open position.

In use, the operator places the handle in the palm of his/her hand and squeezes the lever with the fingers of the same hand. The force applied to the lever causes the lever to pivot thereby causing the wire core of the cable to be at least partially retracted back into the exterior sheath. As the wire core is retracted, force is placed against the coiled spring causing a controlled movement of the carriage mechanism within the groove and towards the top of the center support post. As the carriage mechanism slides away from the V-shaped member force is transmitted through the extension members and causes each of the respective L-shaped members to pivot at their respective support posts forcing their respective short legs to urge the pincers in a converging direction in the interior of the V-shaped member.

To attach a corner bead to an exterior drywall corner, the corner bead is disposed with the V-shaped member of the apparatus and the lever actuated so that the converging pincers, particularly the pointed ends thereof, force portions of the corner bead into the drywall thereby frictionally engaging the corner bead to the drywall surfaces at opposing pairs of locations. Repeated use of the apparatus allows the corner beads to be mechanically secured, without additional fastening devices or adhesives, at multiple locations simply by repositioning the apparatus along the corner bead and actuating the lever handle.

According to one aspect of the invention, an apparatus for enabling single-handed attachment of corner beads to drywall comprises: a frame; a pair of contact surfaces coupled to the frame; a lever pivotally attached to the frame; a mechanism for biasing the lever into the first position; a pair of pincers pivotally connected to the frame; a linkage mechanism for transmitting force displacing the lever from the first position into a converging motion of the pincers.

According to a second aspect of the invention, an apparatus for enabling single-handed attachment of corner beads to drywall comprises: a pair of contact surfaces having a handle coupled thereto; a pair of pincers arranged for pivotable motion relative to said contact surfaces; a linkage mechanism for transmitting one of a pair of opposing forces applied to said handle into a force capable of deforming the corner bead.

According to another aspect of the invention, a method for enabling single-handed attachment of corner beads to drywall comprises: receiving a corner bead within a pair of contact surfaces held by a frame; transmitting to the corner bead force applied to the frame in a first direction; deforming the corner bead with force applied to the frame in a second direction, the second direction being substantially opposite the first direction, the force applied in the second direction being transmitted to and having a direct correlation to a defamation force applied to the corner bead.

BRIEF DESCRIPTION OF THE DRAWINGS

The above and further advantages of the invention may be better understood by referring to the following description in conjunction with the accompanying drawings in which:

FIGS. 11A-14 are the various views of selected items of the linkage system of the apparatus of FIG. 1.

DETAILED DESCRIPTION

Figure 1:
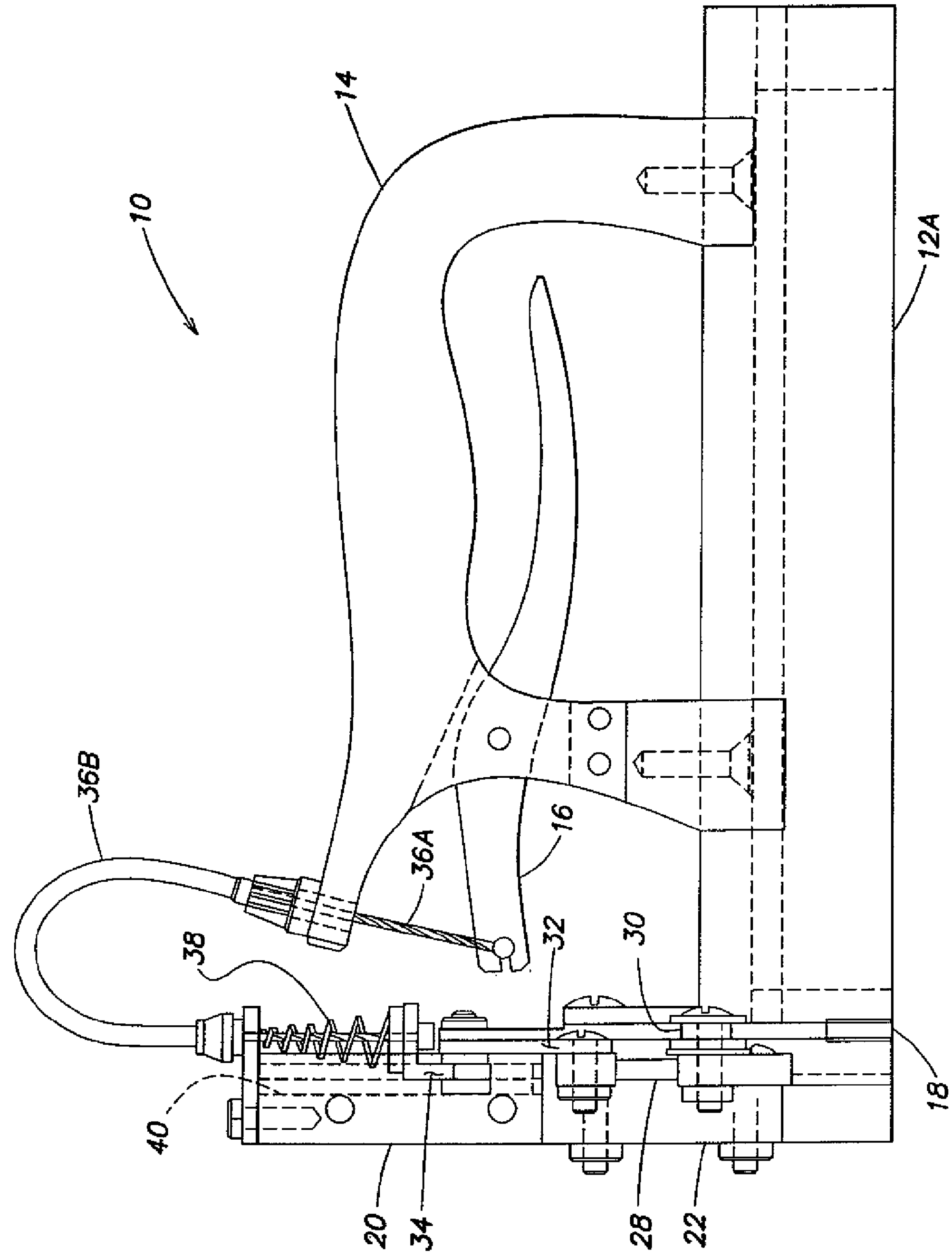
FIG. 1 is a side, cut-away view of the fastening apparatus of the present invention.
Figure 2:
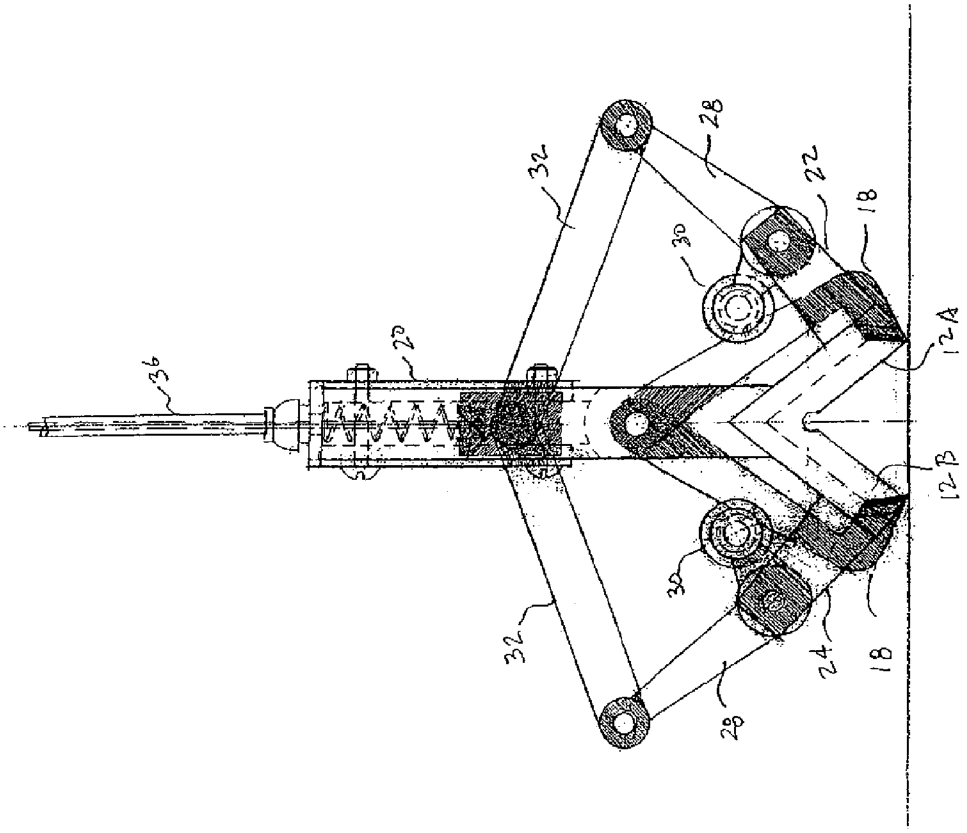
FIG. 2 is a front end, cut-away view of the fastening apparatus of FIG. 1.

The invention contemplates a tool that can be held and operated with one hand to attach a corner bead to an outside corner of drywall. According an illustrative embodiment of the invention, referring to FIGS. 1-7, a fastening apparatus 10 comprises a V-shaped frame 12, a handle 14, a lever 16, a pair of opposed pincers 18, support posts 20-24, and linkage system 26, configured as illustrated. FIG. 1 is a side, cut-away view of the fastening apparatus 10 of the present while FIG. 2 is a front end, cut-away view of the fastening apparatus 10. Unless otherwise noted, any of items 12-24 may be made from precision cast aluminum.

Figure 3A:
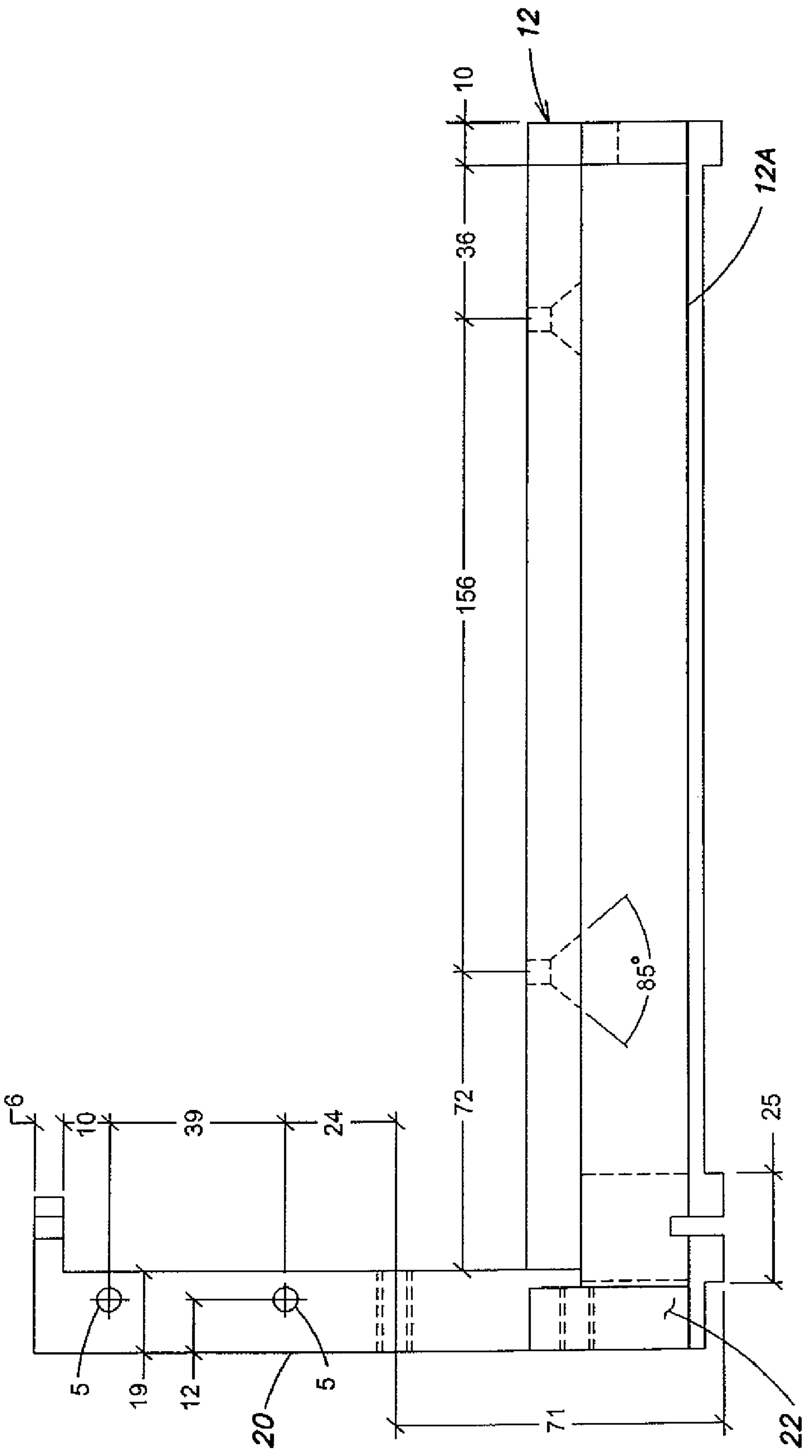
FIGS. 3A-B are side and top views of the frame of the fastening apparatus of FIG. 1 illustrating the positions of multiple support posts attached thereto.
Figure 3B:
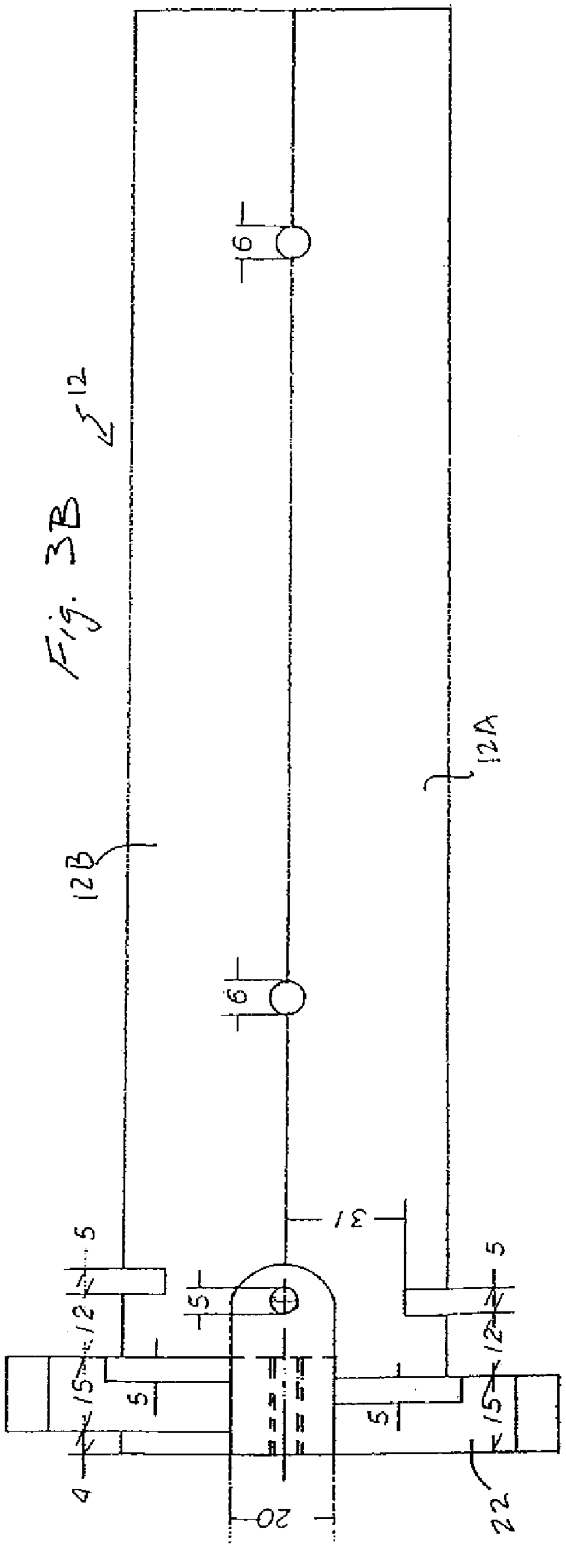

FIGS. 3A-B illustrate side and top views of V-shaped frame 12. V-shaped frame 12 is defined by a pair of flat members 12A-B integrally formed to define a V-shaped interior whose surfaces are disposed at an angle of less than 100° from each other. The apex of the angle defines a partial cylindrical portion of approximately greater than 180°. Note that the partial cylindrical portion may extend along all or a portion of members 12A-B. Frame 12 is designed to receive a standard designed corner bead so that the bead flanges rests against members 12A-B. In the illustrative embodiment, members 12A-B have a generally rectangular shape which extends the length of frame 12. However, in an alternative embodiment, members 12A-B may be shortened to a length that is adequate to receive the corner bead flanges therein. Also, the interior surface angle defined by members 12A-B may be greater than 100° if adequate adaptors are disposed therein to form an angle that is adequate for receiving the quarter bead. For example, an interior angle of 110° formed by members 12A-B may be effectively narrowed by attaching wedge-shaped adapters to the interior surfaces of members 12A-B so that the effect interior ankle is 80°, for example. As noted, frame 12 may be formed integrally from precision cast aluminum or other materials having suitable rigidity. Alternatively, frame 12 may be manufactured from the plurality of components attached together. In yet another embodiment, members 12A-B may be pivotally joined at their apex so as to adapt to variations in corner bead designs.

Figure 4:
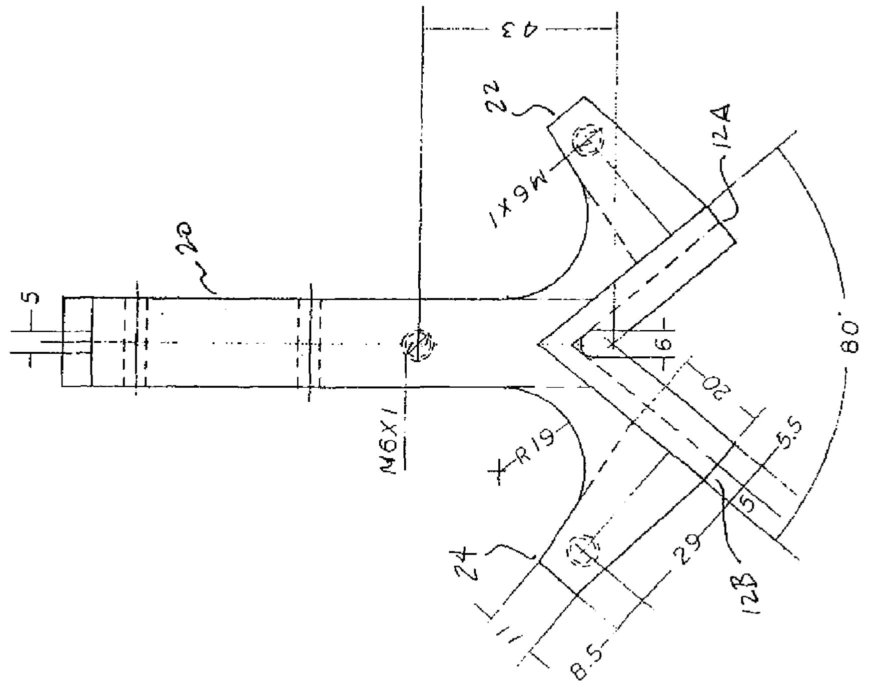
FIG. 4 is a front view of the frame of FIGS. 3A-B.

FIG. 4 is a front view of the frame of FIGS. 3A-B illustrating the position of center support post 20, and side support posts 22-24. As illustrated, support posts 20-24 have a generally rectangular cross-sectional shape over majority of their length, although other shapes and heights may be suitably utilized depending on the implementation of linkage system 26. In the illustrative embodiment, center support post 20 is disposed opposite the apex of the interior angle formed by members 12A-B, while side support posts 22-24 are disposed on the exterior surface of one of the respective frame member 12 and at approximately a right angle thereto. Support posts 20-24 may be formed integrally from precision cast aluminum or other materials having suitable rigidity, along with the other elements comprising frame 12. Alternatively, one or more of support posts 20-24 frame 12 may be manufactured from separate components attached together, for example, welded steel components.

Figure 5A:
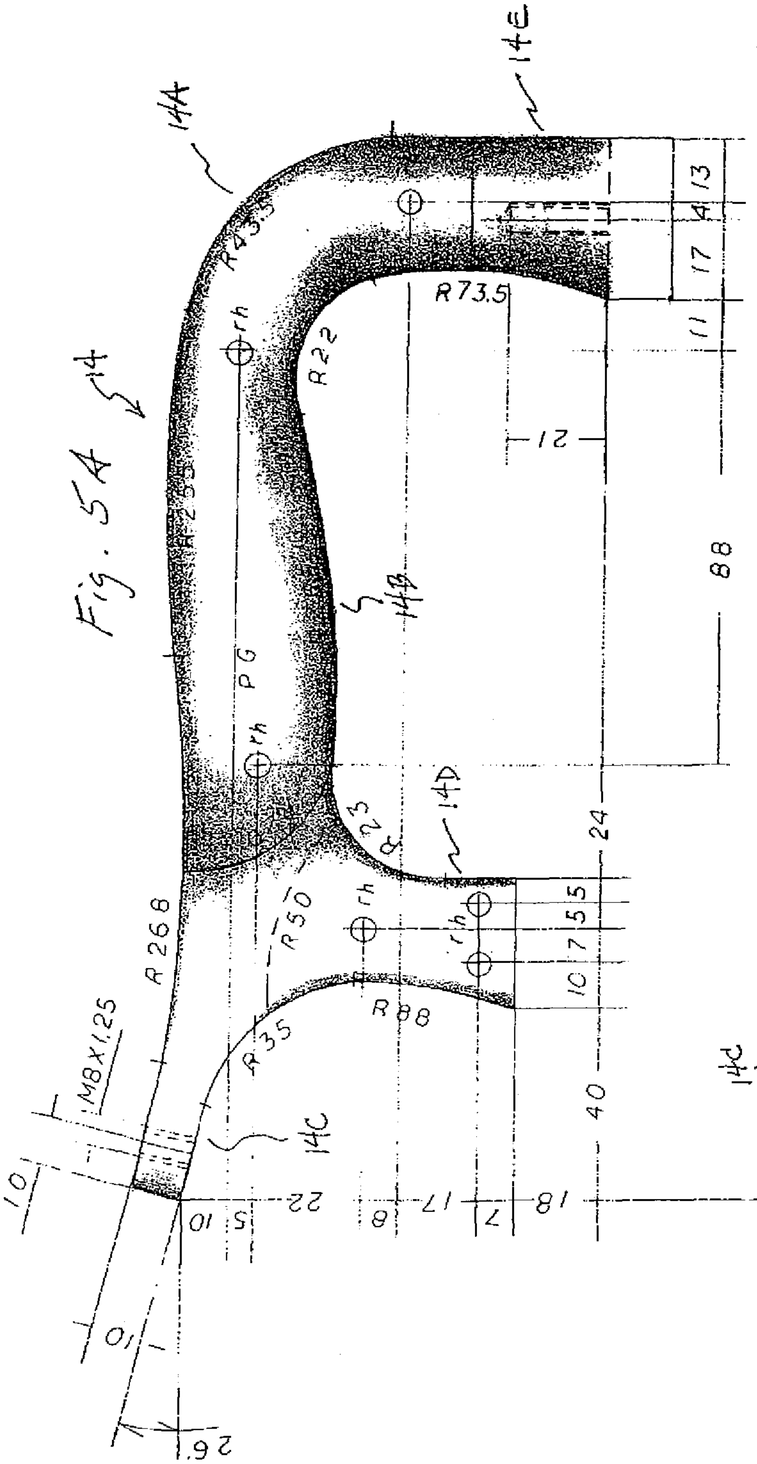
FIGS. 5A-B are side and top views of the handle of the fastening apparatus of FIG. 1.
Figure 5B:
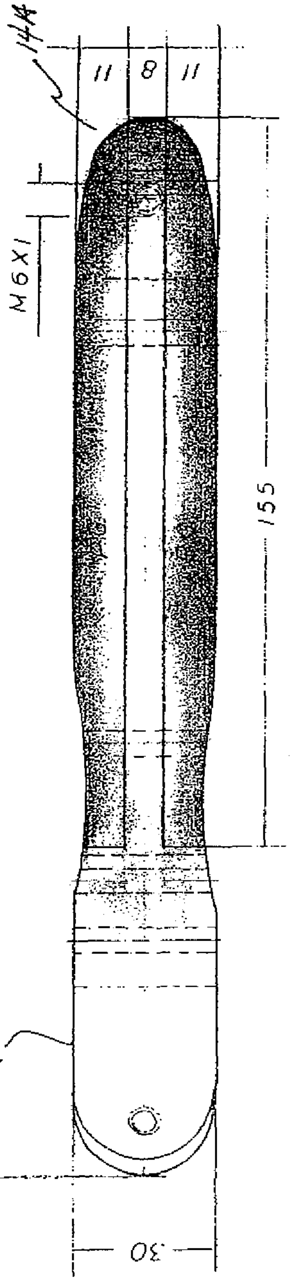
Figures 6A, 6B, 6C, 6D:
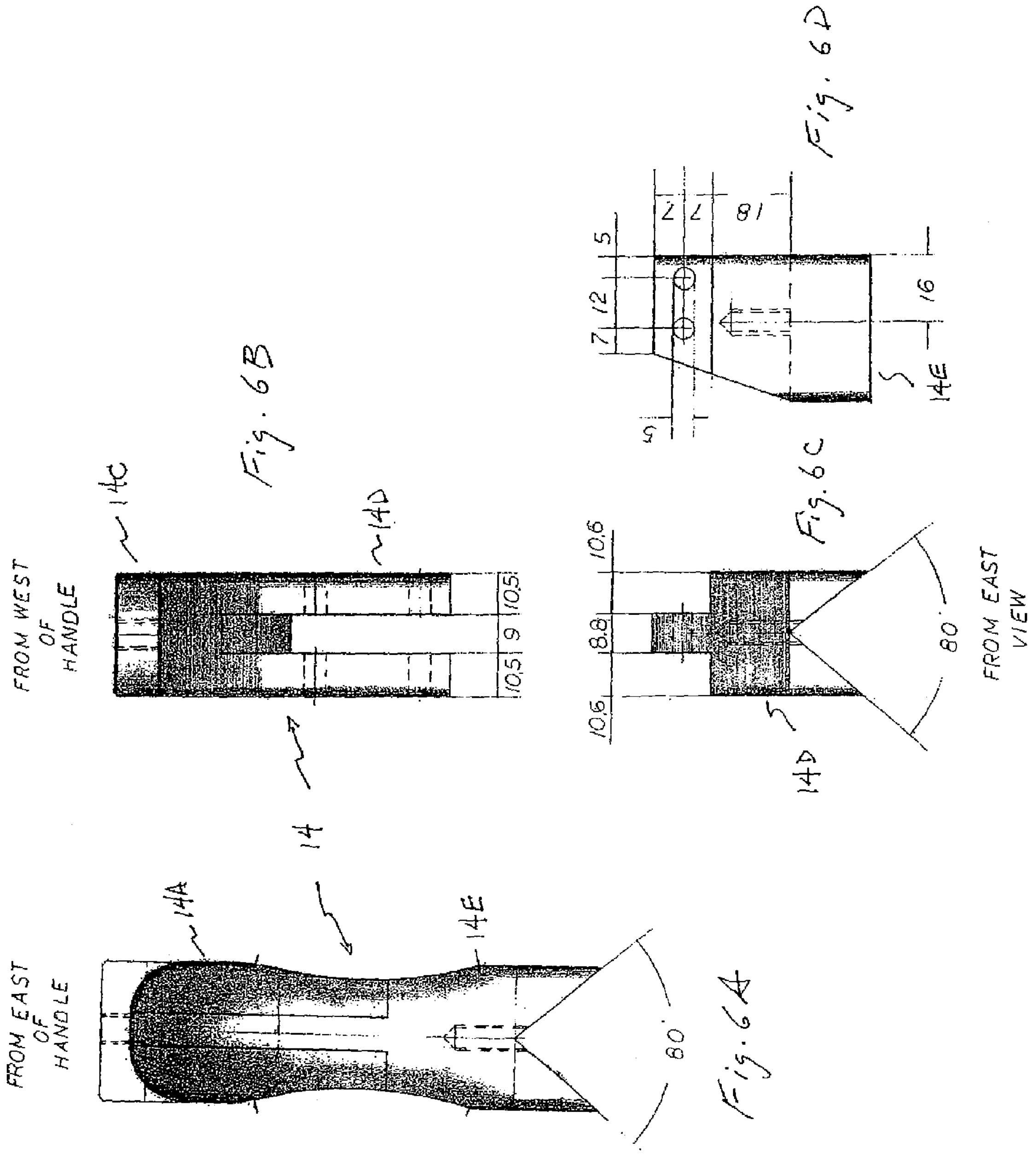
FIGS. 6A-D are rear, front, partial rear, and partial side, views, respectively, of the handle of the fastening apparatus of FIGS. 5A-B.

Handle 14 has an inverted U-shaped defining a gripping area 14B interconnecting legs 14D-E. FIGS. 5A-B are side and top views of the handle 14 according to the illustrative embodiment. As illustrated in FIG. 5A, handle 14 may have a rounded end 14A and a gripping area 14B characterized by rounded exterior surfaces to accommodate grasping or placement within the palm of the operator's hand. Gripping area 14B may be formed out plastic or other synthetic resins, as well as natural or synthetic rubber or combinations thereof, or any other suitable material that has a high enough coefficient of friction to ensure a secure grip while preventing fatigue to the operator's hand over prolonged periods. An aperture extends through handle end 14C to accommodate the tension cable of linkage system 26, as explained hereinafter. A second aperture extends through one of the legs of handle end 14 to facilitate pivotal mounting of lever 16, as explained hereinafter. FIGS. 6A-D illustrate additional rear, front, partial rear, and partial side, views, respectively, of the handle 14. Legs 14D-E of U-shaped handle 14 are formed at an angle which mimics the exterior angle formed by members 12A-B to facilitate the attachment of handle 14 to frame 12.

Figure 7A:
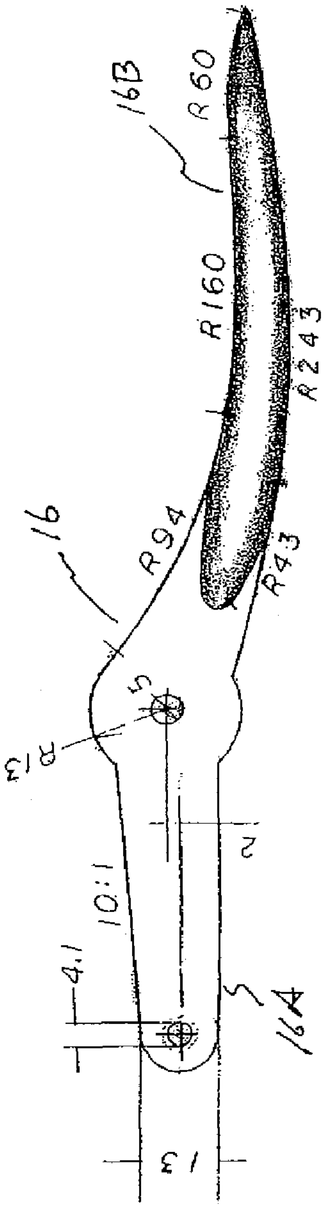
FIGS. 7A-B are side and top views of the lever of the fastening apparatus of FIG. 1.
Figure 7B:
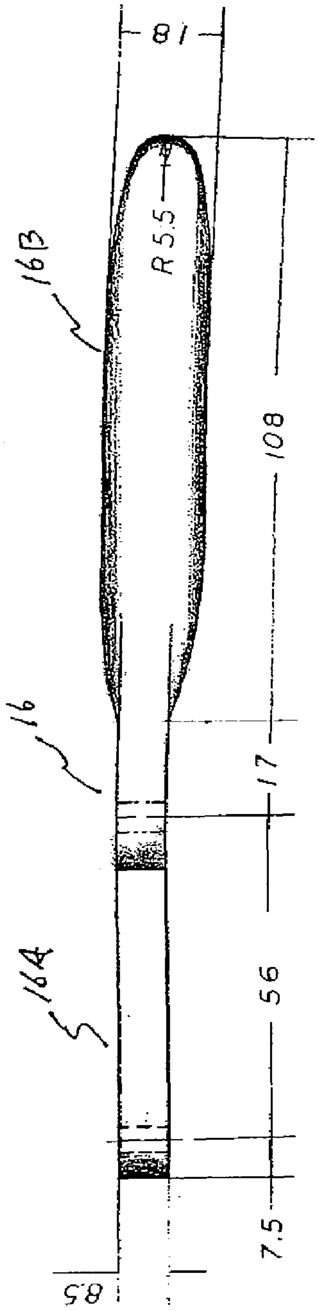

Lever 16 is pivotally coupled to leg 14D of handle 14. Lever 16 also defines an elongated gripping area 16B. FIGS. 7A-B are side and top views of the lever 16 according to the illustrative embodiment. As illustrated gripping area 16B is characterized by rounded exterior surfaces to accommodate squeezing by the operator's fingers. Should Gripping area 16B may be formed out plastic or other synthetic resins, as well as natural or synthetic rubber or combinations thereof, or any other suitable material that has a high enough coefficient of friction to ensure a secure grip while preventing fatigue to the operator's hand over prolonged periods. An aperture extends through handle end 14A to accommodate the tension cable of linkage system 26, as explained hereinafter. A second aperture extends through an intermediate portion of lever 16 to facilitate pivotal mounting of lever 16, to leg 14D of handle 14. As explained herein, counterpressure applied simultaneously to both handle 14 and lever 16 causes actuation of linkage system 26 thereby causing pincers 18 to converge forcing a corner bead resting within V-shaped frame 12 to become inwardly deformed into an exterior corner of drywall thereby creating a frictional attachment to the drywall, without extra fastening devices.

Figure 10B:
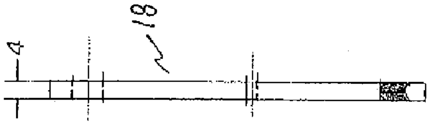
FIGS. 10A-C are side, front and top views of the pincer element of the apparatus of FIG. 1.
Figure 10C:
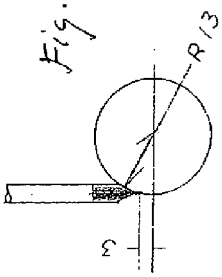
Figure 10A:
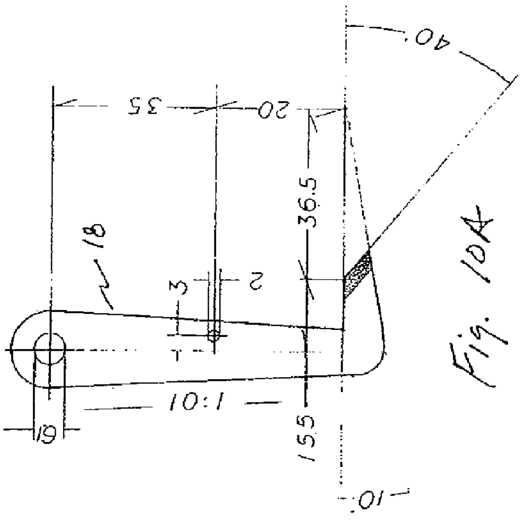

A pair of opposed pincers 18 having pointed tips 18A extending through apertures 12C within members 12A-B are movably coupled to frame 12 so as to allow the tips 18A to move in a converging direction, as illustrated in FIG. 2. FIGS. 10A-C are side, front and top views of pincers 18. Pincers 18 may be formed from 55 carbon steel or other materials having suitable rigidity. The non-pointed ends of the pincers are pivotally joined together at a point along the center support post 20. A spring 26 biases pincers 18 into an open or divergent configuration.

Figures 11A, 11B, 12A, 12B, 12C, 13A, 13B, 14:
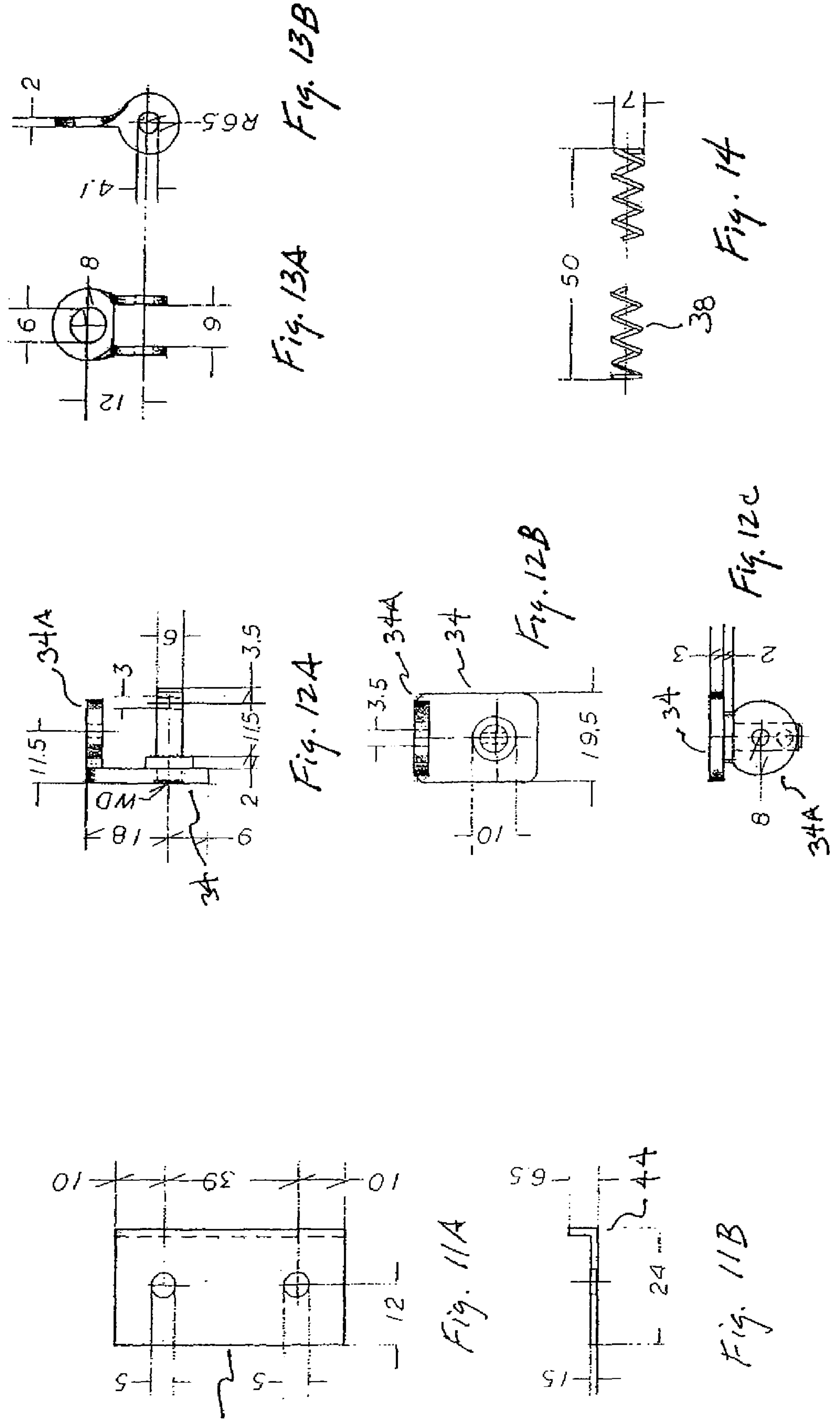

FIG. 14 is a side view of spring 26 which in the illustrative embodiment may be formed of heat treated spring steel and is coupled to pincers 18 via right angle ends, not shown, which extend through apertures in pincers 18. In the illustrative embodiment, spring 26 may be partially compressed with approximately 2-3 pounds off pressure applied thereto.

Linkage system 26 translates force applied to handle 14 and lever 16 into a converging motion forcing pincers 18 toward each other. Linkage system 26 comprises L-shaped members 28, pincer guides 30, extension arms 32, carriage 34, cable 36, coil spring 38, and miscellaneous connecting elements, such as screws, washers, etc. FIGS. 10A-14B illustrates various views of selected items of the linkage system 26 is described herein.

Figure 8A:
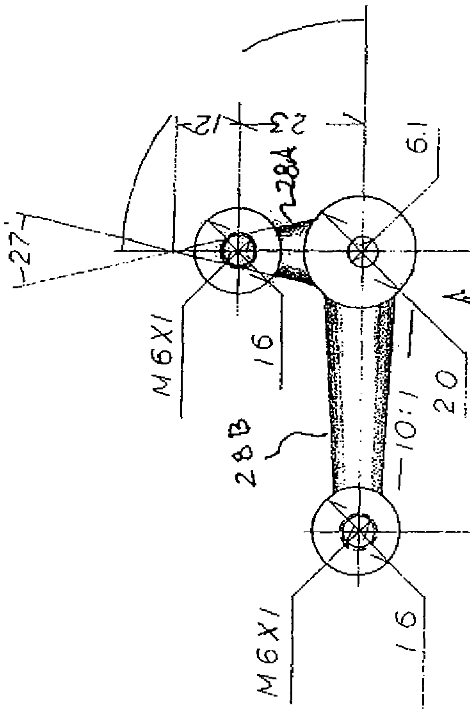
FIGS. 8A-B are side and top views of the L-shaped member of the linkage system of the apparatus of FIG. 1.
Figure 8B:
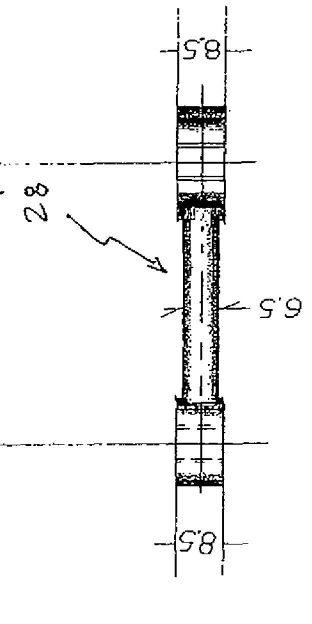
Figure 9B:
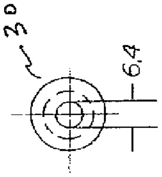
FIGS. 9A-B are side and top views of the urging elements disclose intermediate the L-shaped linkage member and the pincer element of the apparatus of FIG. 1.
Figure 9A:
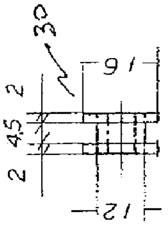

FIGS. 8A-B are side and top views, respectively, of the L-shaped members 28. L-shaped members 28 are pivotally mounted to each side support posts 22-24. In the illustrative embodiment, the short leg 28A of each L-shaped member is in contact with one of pincers 18 via a pincer guide 30 attached to the L-shaped member. FIGS. 9A-B are side and top views, respectively, of pincer guides 30.

The longer leg 18B of each L-shaped member 28 is pivotally coupled to the first end 3A of one of the two extension arms 32. Extension arms 32 are pivotally coupled at their respective second ends 32B to carriage 34. Carriage 34 is slidably disposed within a track or groove 40 formed by a pair of plates 44 mounted to the top of center support post 20. FIGS. 11A-B are top and side views, respectively, of plate 44, which in the illustrative embodiment may be formed of heat treated spring steel and is coupled to the top end of center support post 20 via a fastening device, such as more a screws and bolts, etc. Each of plates 44 is mounted to the sides of center post 20 so that the lip thereof overlaps a grove of depression in center post 20 to define the channel into which carriage 34 is received and travels. A tab 34A extending from carriage 34 is secured to one end of a cable 36. FIGS. 12A-C are side, front and top views, respectively, of carriage 34 which in illustrative embodiment may be formed all 55 carbon steel or other suitably rigid material.

In the illustrative embodiment the cable 36 is of a coaxial design with a movable multistrand wire core 36A extending through a semi-rigid tubular sheath 36B. An extreme end of the wire core 36A is attached to the carriage tab 34A while the extreme end of the wire sheath 36B is coupled to the top of the center support post via plate 44.

The second end of the cable 36 is pivotally secured to end 16B of lever 16. FIGS. 13A-B are side and top views, respectively, of cable fastener 46 which in the illustrative embodiment may be formed of heat treated spring steel and movably couples the second end of the cable 36 to end 16B. A cable tension adjustment element 48 is secured to one end of sheath 36 become as illustrated in FIG. 1 and enables the amount of friction applied to wire core 36A to the rotatably adjusted. Coiled spring 38, which serves as a tensioning mechanism, is disposed about the unsheathed or exposed length of the wire core 36A to bias the wire/carriage away from the top of the center support post 20 and plate 44, and, therefore, biases the lever 16 into an open position. Together, spring 38 and tension adjustment element 48 collectively define the amount of force that must be applied to lever 16 in order to force pincers 18 to converge. The arrangement of elements comprising linkage system 26 is the best shown as illustrated in FIGS. 1-2.

The apparatus described herein enables transmitting to the corner bead force applied to the frame 12 in a first direction while deforming the corner bead with force applied to the lever 16 in a second direction, the second direction being substantially opposite the first direction. As such, one hand can provide the force in both the first and second directions.

In use, the operator places the handle 12 in the palm of his/her hand and squeezes the lever 16 with the fingers of the same hand. The force applied to the lever 16 causes the lever to pivot thereby causing the wire core of the cable 36 to be at least partially retracted back into the exterior sheath. As the wire core is retracted, force is placed against the coiled spring 38 causing a controlled movement of the carriage mechanism 34 within the groove and towards the top of the center support post 20. As the carriage mechanism slides away from the V-shaped members 12A-B, force is transmitted through the extension members 32 and causes each of the respective L-shaped members 28 to pivot at their respective support posts forcing their respective short legs to urge the pincers 18 in a converging direction into the interior of the V-shaped member.

To attach a corner bead to an exterior drywall corner, the corner bead is disposed with the V-shaped member of the apparatus and the lever actuated so that the converging pincers, particularly the pointed ends thereof, deform the corner bead and force portions of the corner bead into the drywall thereby frictionally engaging the corner bead to the drywall surfaces at opposing pairs of locations. Repeated use of the apparatus allows the corner beads to be mechanically secured, without additional fastening devices or adhesives, at multiple locations simply by repositioning the apparatus along the corner bead and actuating the lever handle. The apparatus of the present invention may be used with numerous commercially available corner bead designs that are formed of any soft metal, such as tin or other malleable materials. Note that no actual arrangement of apertures within the flanges of the corner bead are required since the apparatus described here in the catches the corner bead through deformation and not attachment elements such as screws, nails, staples, etc.

FIGS. 15-24B illustrate a second embodiment of a fastening apparatus according to the present invention. The construction and function of fastening apparatus 110 is generally similar to that of apparatus 10 described herein with some exceptions. The fastening apparatus 110 of the second illustrative embodiment comprises a V-shaped frame 112, a handle 114, a lever 116, a pair of opposed pincers 118, and linkage system 126, configured as illustrated. In the illustrative second embodiment, a portion of handle 114 may be integrally formed with frame 112, as explained hereinafter. Unless otherwise noted, any of items 112-118 may be made from precision cast aluminum.

FIGS. 17-18 and 20A-B illustrate various views of V-shape frame 112. V-shaped frame 112 is defined by flat members 112A-B and center post 120. Flat members 112A-B are joined to define a V-shaped interior whose surfaces may be disposed at an angle similar to describe with reference to frame 12 of apparatus 10. Frame 112 may be formed integrally from precision cast aluminum or other materials having suitable rigidity. Alternatively, frame 112 may be manufactured from the plurality of components attached together.

Figure 22A:
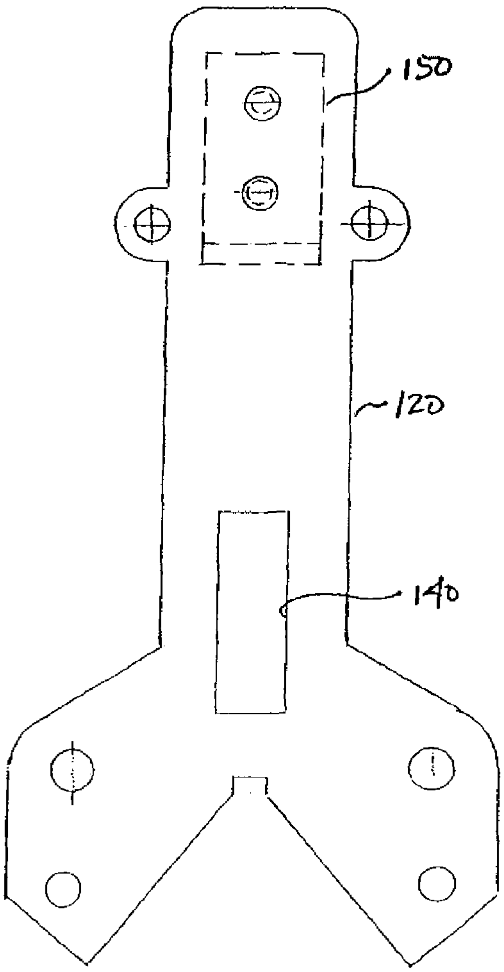
FIGS. 22A-B are front and side views of the center support member of the apparatus of FIG. 15.
Figure 22B:
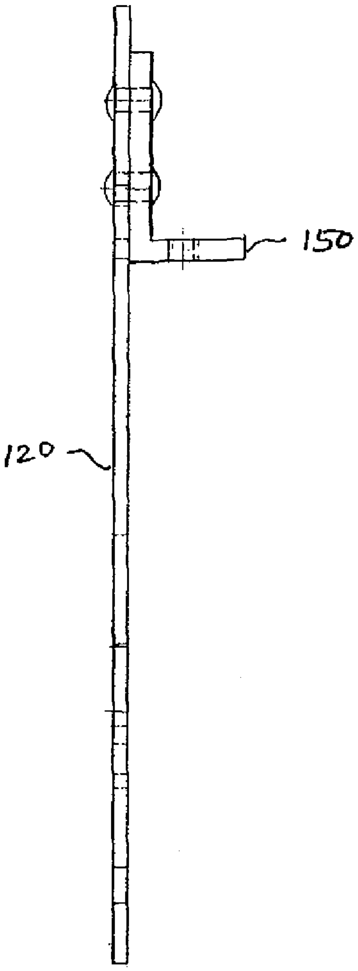
Figure 23A:
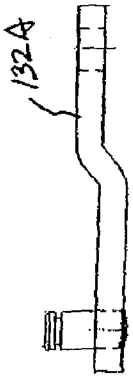
FIGS. 23A-D are side and top views of the extension arms of the linkage mechanism of the apparatus of FIG. 15.
Figure 23B:
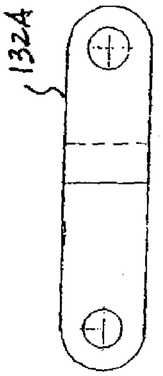
Figure 23C:
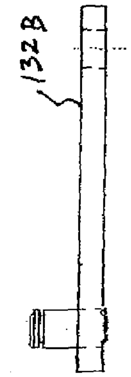
Figure 23D:
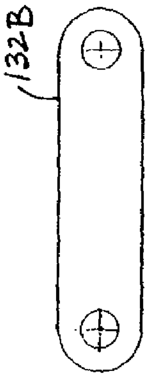

FIGS. 22A-B are front and side views of center post 120. In the illustrative embodiment, center support post 120 is secured adjacent members 112A-B and ankle component 114B, and may be formed from precision cast aluminum or other materials having suitable rigidity, along with the other elements comprising frame 112.

Figure 18:
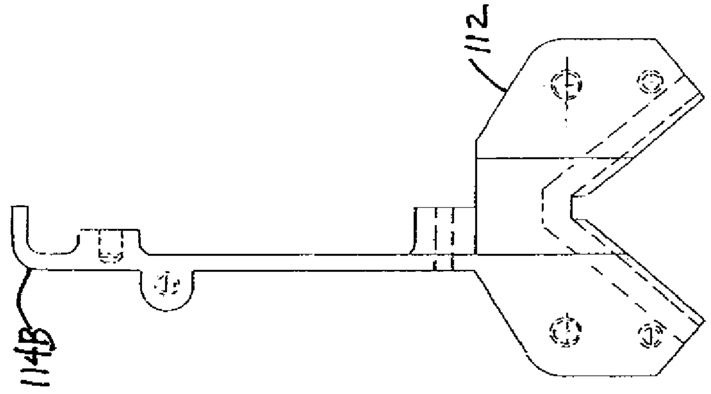
FIG. 18 is a front view of the frame of FIG. 17.
Figure 20A:
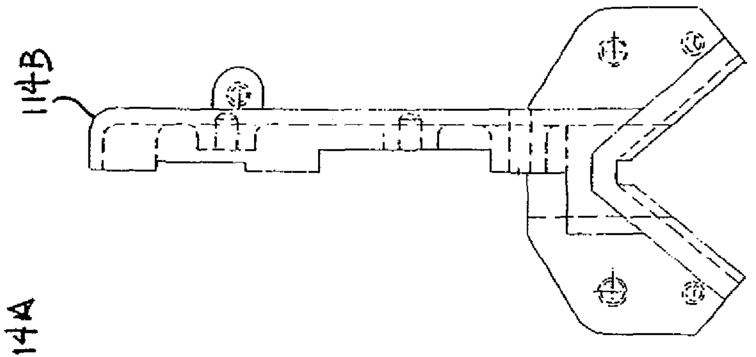
FIGS. 20A-B are front and top views of the frame of the fastening apparatus of FIG. 15.
Figure 19B:
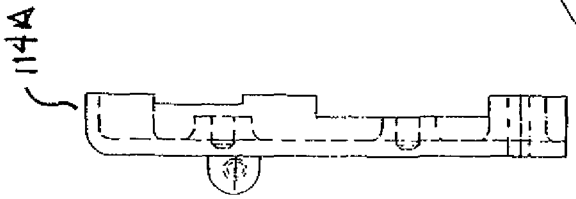
FIGS. 19A-B are side and front views of the handle of the fastening apparatus of FIG. 15.
Figure 20B:
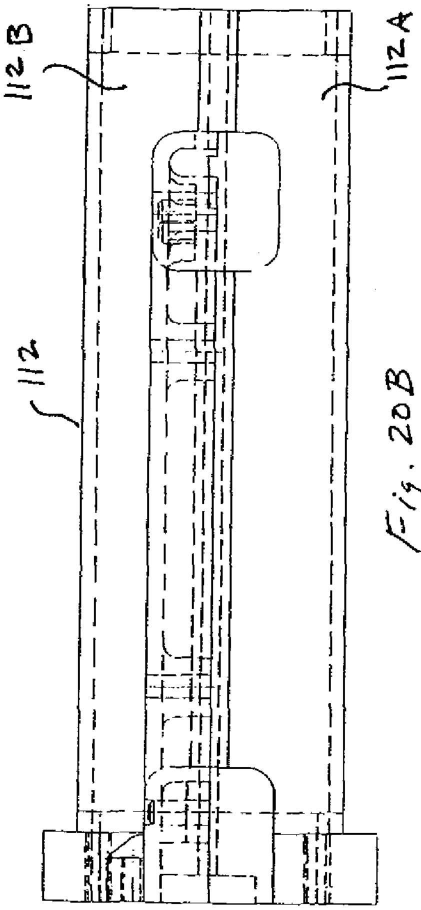
Figure 19A:
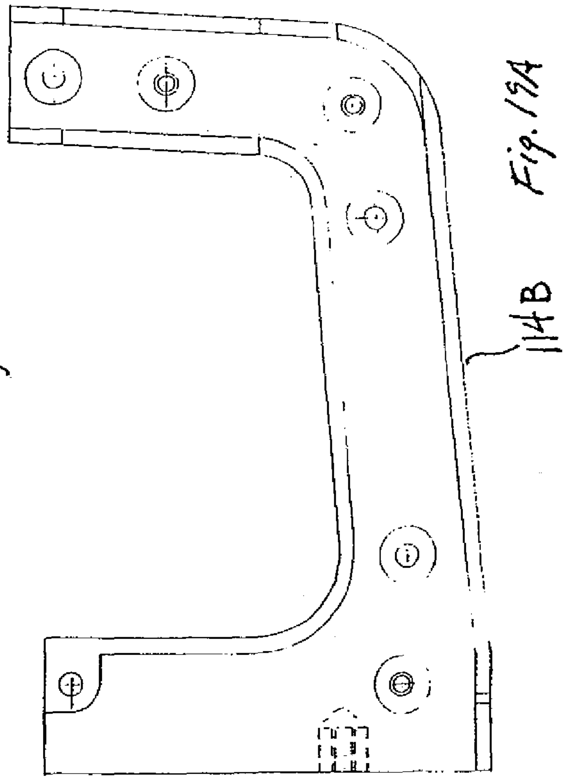

Handle 114 has a generally inverted U-shaped, and, in the second illustrative embodiment, is formed from complementary mating halves 114A-B, illustrated with FIGS. 18, 19A-B and 20A. In the illustrative embodiment, half handle 114B is integrally formed with frame 112, as illustrated in FIGS. 18 and 20A. Handle 114 may have a rounded end and a gripping area to accommodate grasping or placement within the palm of the operator's hand. A pair of apertures extend through handle right halves 114A-B into which rollers 146 are journaled via axles 148 to accommodate and tension cable 136 of linkage system 126, as explained hereinafter. A third aperture extends through at least one of handle halves 114A-B to facilitate pivotal mounting of lever 116.

Figures 21A, 21B, 21C:
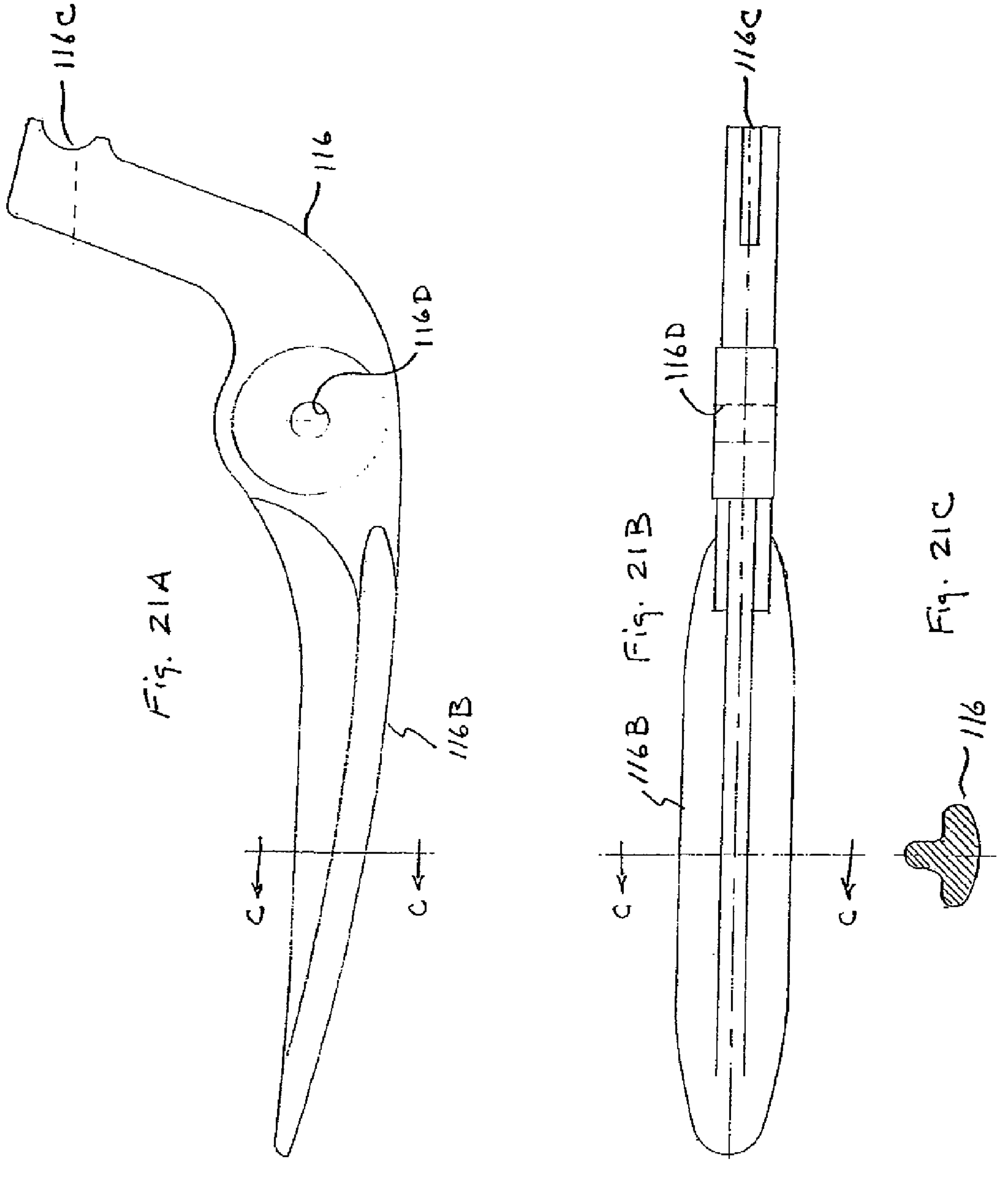
FIGS. 21A-B are side and top views of the lever of the fastening apparatus of FIG. 15.
FIG. 21C is a cross-sectional view of the lever of the FIGS. 21A-B taken along lines C-C thereof.

Lever 116 is pivotally coupled to handle 114. Lever 116 also defines an elongated gripping area 116B. FIGS. 21A-C are side, top and cross-sectional views, respectively, of the lever 116 according to the second illustrative embodiment. As illustrated gripping area 116B is characterized by rounded exterior surfaces to accommodate squeezing by the operator's fingers. A slot 116C is disposed at an end of lever 116 to accommodate securing of tension cable 136 of linkage system 126. An aperture 116D extends through an intermediate portion of lever 116 to facilitate pivotal mounting of lever 116 to handle 114. As explained herein, counterpressure applied simultaneously to both handle 114 and lever 116 causes actuation of linkage system 126 thereby causing pincers 118 to converge forcing a corner bead resting within V-shaped frame 112 to become inwardly deformed into an exterior corner of drywall thereby creating a frictional attachment to the drywall, without extra fastening devices.

Figure 16:
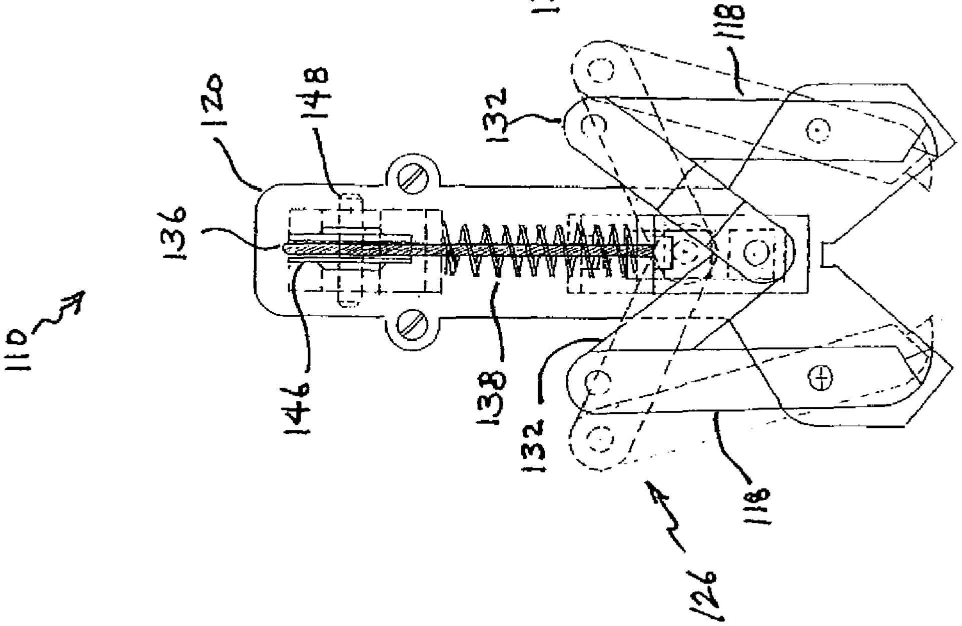
FIG. 16 is a front end, cut-away view of the fastening apparatus of FIG. 15 with a more converged position of pincers 118 illustrated in phantom.
Figure 17:
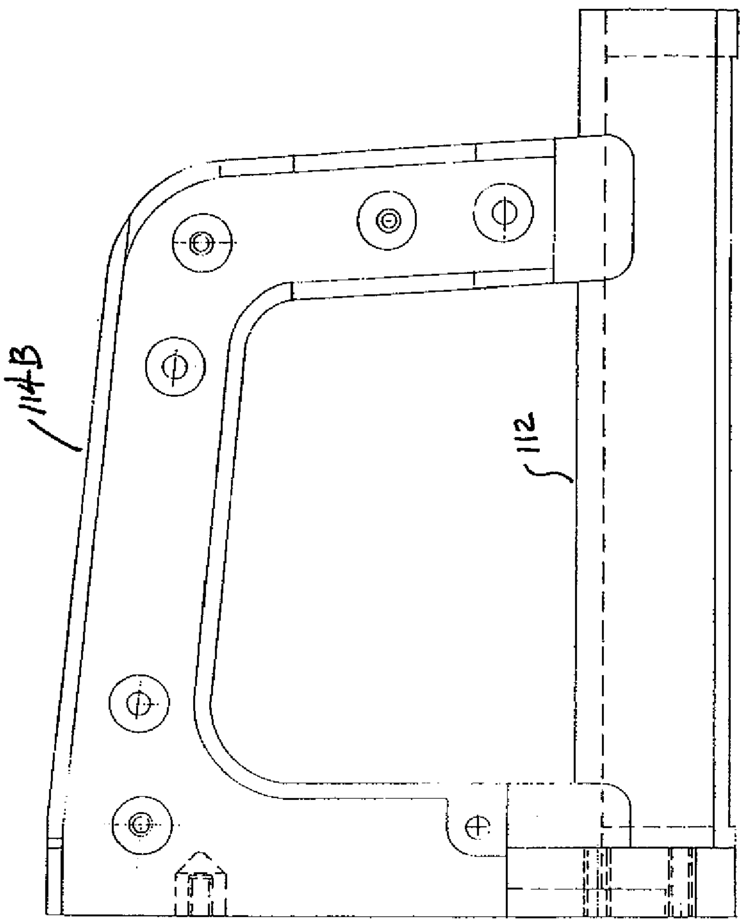
FIG. 17 is a side view of the frame and handle of the fastening apparatus of FIG. 15.
Figure 24A:
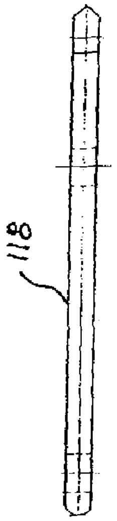
FIGS. 24A-B are side and top views of the pincer element of the apparatus of FIG. 15.
Figure 24B:
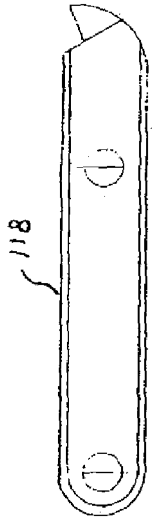

A pair of opposed pincers 118 having pointed tips 118A are disposed exterior of members 112A-B and are movably coupled to center support post 120 so as to allow the tips 118A to move in a converging direction, as illustrated in FIG. 16. FIGS. 24A-B are top and side views of pincers 118. Pincers 118 may be formed from 55 carbon steel or other materials having suitable rigidity. A point along each of the pincers 118 is pivotally attached at a point along center support post 120, as illustrated.

Figure 15:
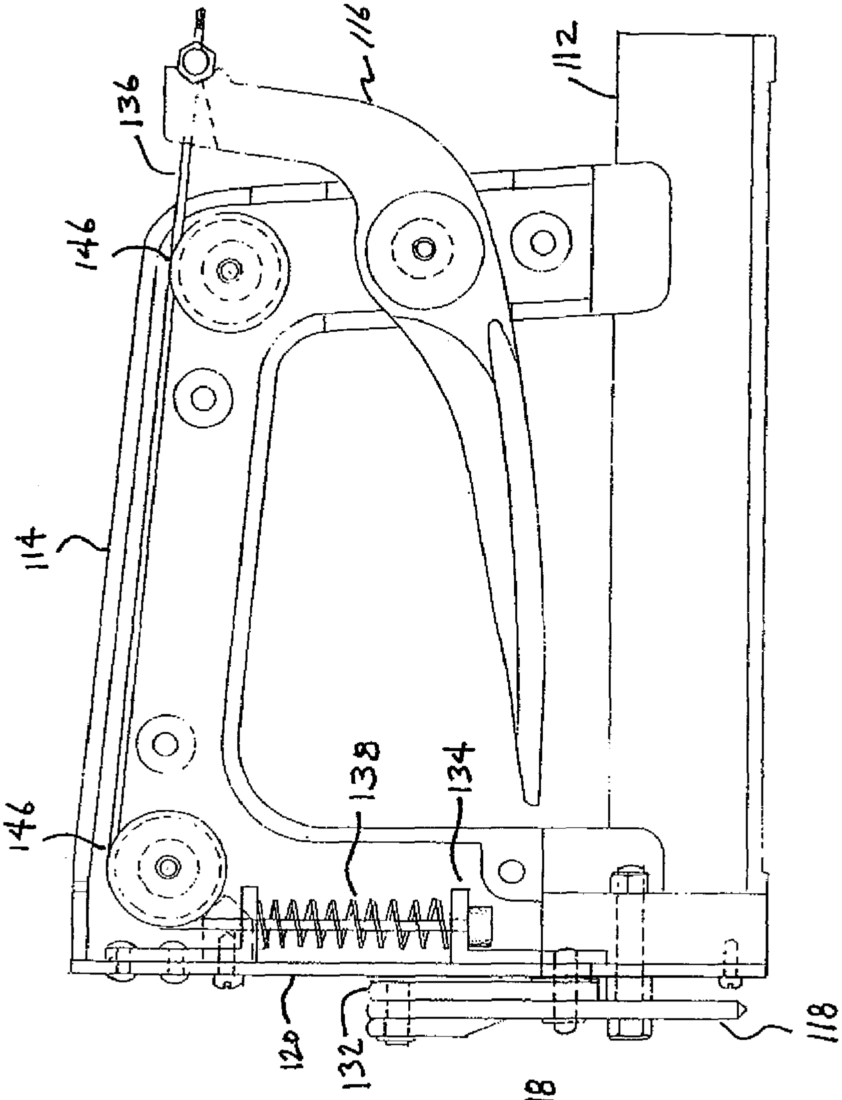
FIG. 15 is a side, cut-away view of a second embodiment of a fastening apparatus according to the present invention.

Linkage system 126 translates force applied to handle 114 and lever 116 into a converging motion forcing pincers 118 toward each other. Linkage system 126 comprises extension arms 132, carriage 134, cable 136, coil spring 138, stop 150 and miscellaneous connecting elements, such as screws, washers, etc. FIGS. 15-16 illustrates various views of selected items of the linkage system 126 is described herein.

Extension arms 132 are pivotally coupled at their respective first ends to one of each of pincers 118. Extension arms 132 are pivotally coupled at their respective second ends to carriage 134. Carriage 134 is slidably disposed within a track or groove 140 formed in center support post 120. FIGS. 22A-B are top and side views, respectively, of stop 150, which in the illustrative embodiment may be formed of heat treated spring steel and is coupled to the top end of center support post 120 via a fastening device, such as more a screws and bolts, etc. Cable 136 passes through stop 150 which also serves to limit the compression of spring 138 during actuation of linkage system 126.

In the illustrative embodiment, cable 136 may be of a design similar to cable 36 of apparatus 10. An extreme end of the wire core 136 is attached to the carriage 134 and passes through stop 150 and over rollers 146. The second end of the cable 136 is secured to slot 116C of lever 116.

Coiled spring 138, which serves as a tensioning mechanism, is disposed about a length of the wire core 136 to bias the wire/carriage away from the top of the center support post 120 and stop 150, and, therefore, biases the lever 116 into an open position. Spring 138 collectively defines the amount of force that must be applied to lever 116 in order to force pincers 118 to converge. In the illustrative embodiment, spring 138 may be partially compressed with a force in excess of approximately 2-3 pounds off pressure applied thereto.

The arrangement of elements comprising linkage system 126 is the best shown as illustrated in FIGS. 15-16. FIG. 16 is a front end, cut-away view of the fastening apparatus of FIG. 15 illustrating the relationship between cable 136, carriage 134 and pincers 118. When lever 116 is biased into its resting or first position, cable 136 allows carriage 134 to rest at its lowest position on center support 120, as illustrated in FIG. 16. As tension is applied to lever 116, cable 136 is pulled forcing carriage member 134 into an upward motion relative center support 120 that is controlled by the compression of spring 138. As carriage 134 rises, the V-shaped angle formed between linkage arms 132 in their at rest position begins to increase, forcing pincers 118 to pivot at their respective points of attachment to center support 120 from their at rest position, shown in solid lines in FIG. 16, to a more converged position, illustrated in phantom in FIG. 16.

In use, the operator places the handle in the palm of his/her hand and squeezes the lever with the fingers of the same hand. The force applied to the lever 116 causes cable 136 to be pulled. As the wire is pulled, force is placed against the coiled spring 138 causing a controlled movement of the carriage mechanism 134 towards the top of the center support post 120. As the carriage mechanism slides away from the V-shaped members 112A-B, force is transmitted through the extension arms 132 and causes each of the pincers 118 to pivot at their respective points of attachment to support post 120 and urging the pincers in a converging direction into the interior of the V-shaped member.

From the foregoing, the reader can appreciate that the invention discloses an apparatus capable of receiving a corner bead within a pair of contact surfaces held by a frame; transmitting to the corner bead force applied to the frame in a first direction; deforming the corner bead with force having a component applied to the frame in a second direction, the second direction being substantially opposite the first direction, the force applied in the second direction being transmitted to and having a direct correlation to a defamation force applied to the corner bead.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not by the particular features which have been shown and described, but shall be construed also to cover any obvious modifications and equivalents thereof.

What is claimed is:

1. An apparatus for enabling single-handed attachment of corner beads comprising:

a frame;

a pair of contact surfaces rigidly coupled to the frame;

a lever pivotally attached to the frame;

a spring mechanism for biasing the lever into a biased first position;

a pair of pincers pivotally connected to the frame; and a linkage mechanism mechanically coupling the lever to the pair of pincers for translating a force displacing the lever from the biased first position into a controlled converging motion of the pincers.

2. The apparatus of claim 1 wherein the contact surfaces define a V-shaped interior with the contact surfaces disposed at an angle.

3. The apparatus of claim 2 wherein the contact surfaces are disposed at an angle of less than 100° therebetween.

4. The apparatus of claim 2 wherein the apex of the angle defines a partial cylindrical portion of at least 180°.

5. The apparatus of claim 1 wherein the linkage mechanism comprises a cable operatively coupling the lever to the pair of pincers.

6. The apparatus of claim 1 wherein the spring is disposed adjacent a carriage slidably mounted to said frame.

7. The apparatus of claim 6 wherein an amount of compression and decompression of the spring is defined by a position or the carriage relative to the frame.

8. The apparatus of claim 6 wherein the carriage is coupled to said cable and each of the pincers are operatively coupled to the carriage by at least one linkage arm.

9. An apparatus for enabling single-handed attachment of corner beads comprising:

a frame having a pair of contact surfaces rigidly coupled thereto;

a lever pivotally attached to the frame;

a spring for biasing the lever into a biased first position;

a pair of pincers arranged for pivotable motion relative to said contact surfaces; and a linkage mechanism mechanically coupling the lever to the pair of pincers for translating forces applied to said lever in the biased first position into a controlled force capable of deforming a corner bead adjacent said contact surfaces.

10. The apparatus of claim 9 wherein the contact surfaces define a V-shaped interior with the contact surfaces disposed at an angle.

11. The apparatus of claim 10 wherein the contact surfaces are disposed at an angle of less than 100° therebetween.

12. The apparatus of claim 11 wherein the apex of the angle defines a partial cylindrical portion of at least 180°.

13. The apparatus of claim 9 wherein the linkage mechanism comprises a cable operatively coupling a lever pivotally attached to the handle with the pair of pincers.

* * * * *